No. 784,884. PATENTED MAR. 14, 1905.
J. J. PRICE.
TUBE CLEANER.
APPLICATION FILED JAN. 20, 1904.
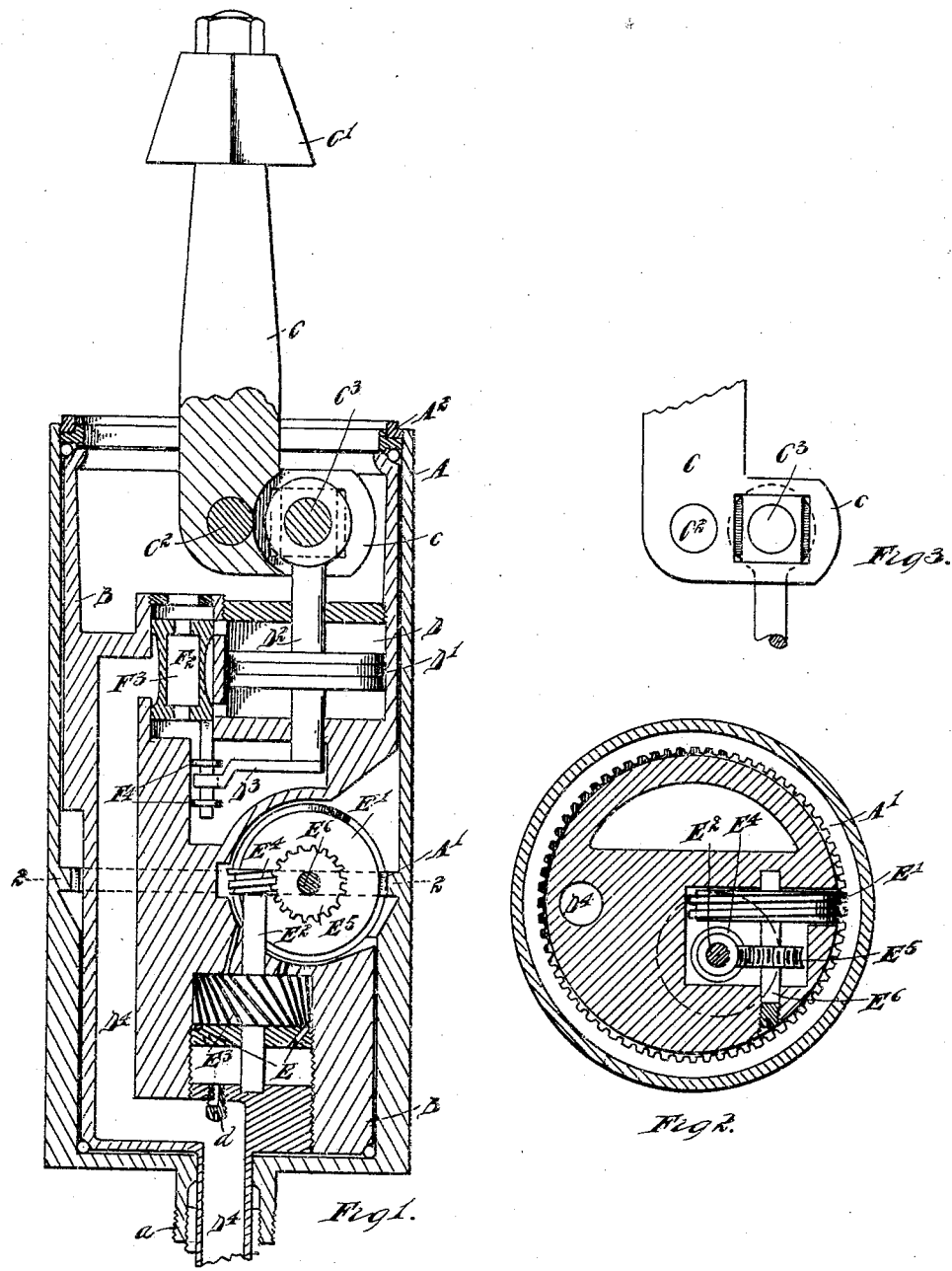
WITNESSES
J. J. Massey
Lotta Lee Hayton
INVENTOR
John J. Price
By Parker & Burton
Attorneys.

No. 784,884. Patented March 14, 1905.

UNITED STATES PATENT OFFICE.

JOHN J. PRICE, OF CEMENT CITY, MICHIGAN.

TUBE-CLEANER.

SPECIFICATION forming part of Letters Patent No. 784,884, dated March 14, 1905.

Application filed January 20, 1904. Serial No. 189,794.

*To all whom it may concern:*

Be it known that I, JOHN J. PRICE, a citizen of the United States, residing at Cement City, county of Lenawee, State of Michigan, have invented a certain new and useful Improvement in Tube-Cleaners; and I declare the following to be a full, clear, and exact description of the invention, such as will enable others skilled in the art to which it pertains to make and use the same, reference being had to the accompanying drawings, which form a part of this specification.

My invention relates to cleaners for the tubes of water-tube boilers; and it consists in the improvements hereinafter described, and pointed out in the claims.

Referring to the accompanying drawings, Figure 1 is a sectional view of a tool-head for cleaning the tubes of water-tube boilers embodying my invention. Fig. 2 is a section on the line 2 2 of Fig. 1. Fig. 3 is a detail view of a part of the bell-crank lever operating the hammer-head and its connection.

In cleaners for the tubes of water-tube boilers a tool-head adapted to loosen the deposit-scale is forced through each tube by a long handle or in the case of bent tubes a hose. Fig. 1 is a section of such a tool-head.

A is an outer cylindrical casing to which the tool-handle is attached at $a$.

A' represents worm-gear teeth formed around the interior surface of the casing A in a plane at right angles to the axis of said casing.

B is an inner casing adapted to turn in the casing A upon ball-bearings. (Shown at each end of the casing B.)

$A^2$ is an annular nut adapted to screw into the open end of the casing A to hold the casing B in position.

Upon the casing B is pivoted at $C^2$ a hammer consisting of a bell-crank lever C, having at its outer end a hammer-head C'.

D is a small cylinder in the casing B, adapted to reciprocate the piston D' therein.

$D^2$ is a piston-rod extending through an aperture in each head of the cylinder B and provided at its rear end with a laterally-extending arm $D^3$ and at its forward end connected by a pivoted and sliding joint $C^3$ to one arm $c$ of the bell-crank lever C.

$F^3$ is a piston-valve adapted to control the distribution of steam to the cylinder D. $F^2$ is an aperture through said piston-valve.

$F^4$ represents lugs upon a rod extending from the piston-valve $F^3$. The arm $D^3$ is adapted to contact the lugs $F^4$ $F^4$ to shift the piston-valve $F^3$ and cause the oscillation of the piston D', and consequently the bell-crank lever C, which causes the hammer-head C' to strike against the side of the tube to loosen the scale.

$D^4$ is the inlet-passage for steam.

In the casing B is pivoted a shaft $E^6$, having thereon a worm-wheel $E^5$ and also a worm E', the thread of the latter engaging the teeth of the internal rack A'.

$E^2$ is a shaft, also pivoted in bearings in the casing B.

$E^4$ is a worm upon the end of the shaft $E^2$, the threads of which engage with the teeth of the worm gear-wheel $E^5$ upon the shaft $E^6$.

$E^3$ is a steam-turbine wheel upon the shaft $E^2$.

E represents ports for delivering jets against the wings or blades of the turbine-wheel $E^3$.

$d$ is a screw-threaded plug by which the quantity of steam admitted to the ports E from the steam-passages $D^4$ may be adjusted.

The operation of the above-described device is as follows: The tool-head is placed in the tube to be cleaned and a pressure of air or steam admitted to the port $D^4$, which causes the reciprocation of the piston D' and the oscillation of the hammer C, causing its head C' to strike against the walls of the tubes and loosen the scale. At the same time steam is admitted to the ports E, causing the turbine-wheel $E^3$ to revolve, which carries with it the shaft $E^2$ and the worm $E^4$, which latter causes the shaft $E^6$ to rotate, which carries with it the worm E', which operating on the teeth of the internal rack A' continually turns the head B in the casing A, carrying with it the hammer C, causing the hammer-head C' to strike a new place upon the wall of the tube at each oscillation of said hammer. The steam or air after passing the turbine-wheel E³ and the cylinder D acts to blow the chips away from the tool-head.

What I claim is—

1. In a device of the class described, the combination of an outer casing, an inner casing rotatable therein, an L-shaped member pivotally attached to said inner casing with its long arm longitudinal and extending outside thereof, a piston mounted in said inner casing and attached to the short end of said L-shaped member and adapted to cause oscillation thereof, means consisting of a worm-wheel and rack and a motor for causing rotation thereof and means for conducting an actuating fluid to said piston and to said motor, substantially as described.

2. In a device of the class described, the combination of an outer casing, a rotatable part interior thereto, an L-shaped member pivotally attached to said rotatable part, having its long arm longitudinal thereof, actuating means mounted in said inner member and attached to the short arm of said L-shaped member and adapted to cause oscillation thereof, a motor carried by the inner rotatable member, independent of the said actuating means, and adapted to act upon the outer casing and cause rotation of its own supporting part with reference thereto, and means connected with said motor for conducting power thereto, substantially as described.

3. In a device of the kind described, the combination of an outer casing, an inner casing adapted to rotate therein, an L-shaped member pivotally attached to said inner casing with its long arm longitudinal thereof, means carried by said inner casing for causing oscillation of said L-shaped member, means consisting of a worm-wheel and rack and a motor for rotating the same, and means connected therewith for conducting an actuating fluid thereto from a suitable source of supply, substantially as described.

4. In a device of the kind described, the combination of an outer casing, an inner casing rotatable therein, a motor mounted thereon, an L-shaped member pivotally mounted on said inner casing, having its long arm longitudinal thereof, means consisting of a piston mounted on said inner member and connected to the short arm of said L-shaped member for causing oscillation thereof, an internal gearing on said outer casing, means consisting of a worm-wheel mounted on the inner casing and meshing with said gearing for causing rotation of said inner casing, and means for conducting an actuating fluid to said rotating and motor means from a suitable source of supply, substantially as described.

5. In a device of the class described, the combination of an outer casing, an inner casing rotatable therein, motor means carried thereby, an L-shaped member pivotally attached to said inner casing, means carried by said inner casing whereby said L-shaped member may be oscillated, means consisting of a worm-wheel carried by said inner casing and a rack upon the inner face of said outer casing whereby the same may be rotated, and means for conducting an actuating fluid from a suitable source of supply to said oscillating and to said rotating means, substantially as described.

In testimony whereof I sign this specification in the presence of two witnesses.

JOHN J. PRICE.

Witnesses:
EARL E. PARKER,
GRANVILLE BOGART.